US009292748B2

(12) United States Patent
Sasaki et al.

(10) Patent No.: US 9,292,748 B2
(45) Date of Patent: Mar. 22, 2016

(54) INFORMATION PROCESSING APPARATUS AND INFORMATION PROCESSING METHOD

(71) Applicant: TOSHIBA TEC KABUSHIKI KAISHA, Shinagawa-ku, Tokyo (JP)

(72) Inventors: Yuta Sasaki, Shizuoka-ken (JP); Hitoshi Iizaka, Shizuoka-ken (JP)

(73) Assignee: Toshiba Tec Kabushiki Kaisha, Tokyo (JP)

( * ) Notice: Subject to any disclaimer, the term of this patent is extended or adjusted under 35 U.S.C. 154(b) by 90 days.

(21) Appl. No.: 14/165,883

(22) Filed: Jan. 28, 2014

(65) Prior Publication Data

US 2014/0219512 A1 Aug. 7, 2014

(30) Foreign Application Priority Data

Feb. 7, 2013 (JP) .................................. 2013-022685

(51) Int. Cl.
*G06K 9/00* (2006.01)
*H04N 5/14* (2006.01)
*H04N 1/40* (2006.01)

(52) U.S. Cl.
CPC ........ *G06K 9/00671* (2013.01); *G06K 2209/17* (2013.01)

(58) Field of Classification Search
CPC ...................................................... G06K 9/00
USPC ............ 382/110; 348/169, 571; 358/448, 462
See application file for complete search history.

(56) References Cited

U.S. PATENT DOCUMENTS 8,355,583 B2 * 1/2013 Matsushita .............. G06K 9/00
358/1.14

FOREIGN PATENT DOCUMENTS

| JP | 2002-074511 | 3/2002 |
| JP | 2004-310287 | 11/2004 |
| JP | 2007-235414 | 9/2007 |
| JP | 2009-187482 | 8/2009 |
| JP | 2010-198137 | 9/2010 |

OTHER PUBLICATIONS

Office Action of Notice of Rejection for Japanese Patent Application No. 2013-022685 Dated Feb. 10, 2015, 5 pages.

* cited by examiner

*Primary Examiner* — Abolfazl Tabatabai
(74) *Attorney, Agent, or Firm* — Turocy & Watson, LLP

(57) ABSTRACT

An information processing apparatus comprises a storage module configured to store feature amounts of standard commodities; an image capturing module configured to photograph a commodity to capture an image of the commodity; an extraction module configured to extract feature amount of the commodity from the image captured by the image capturing module; a calculation module configured to calculate a similarity degree by comparing the feature amount of a standard commodity which is determined as a recognition target in setting information in which a standard commodity serving as a recognition target is set within the standard commodities stored in the storage module with the feature amount of the commodity extracted by the extraction module; and a recognition module configured to recognize a standard commodity of which the similarity degree calculated by the calculation module is greater than a threshold value as a candidate of the commodity.

10 Claims, 10 Drawing Sheets

FIG.3
| F1 COMMODITY ID | COMMODITY CATEGORY | COMMODITY NAME | UNIT PRICE | COMMODITY IMAGE | FEATURE AMOUNT |
|---|---|---|---|---|---|
| XXXXXXX1 | FRUIT | A | 1$ |  | ... |
| XXXXXXX2 | FRUIT | B | 2$ |  | ... |
| XXXXXXX3 | FRUIT | C | 1$ |  | ... |
| XXXXXXX4 | FRUIT | D | 1$ |  | ... |
| ... | ... | ... | ... | ... | ... |
| XXXXX101 | VEGETABLE | K | 2$ |  | ... |
| ... | ... | ... | ... | ... | ... |

FIG.4

| COMMODITY ID | COMMODITY NAME | AUTHENTICATION TARGET SETTING |
|---|---|---|
| XXXXXXX1 | A | ○ |
| XXXXXXX2 | B | ○ |
| XXXXXXX3 | C | |
| XXXXXXX4 | D | ○ |
| ⋮ | ⋮ | ⋮ |
| XXXXX101 | K | |
| ⋮ | ⋮ | ⋮ |

F2

FIG.5
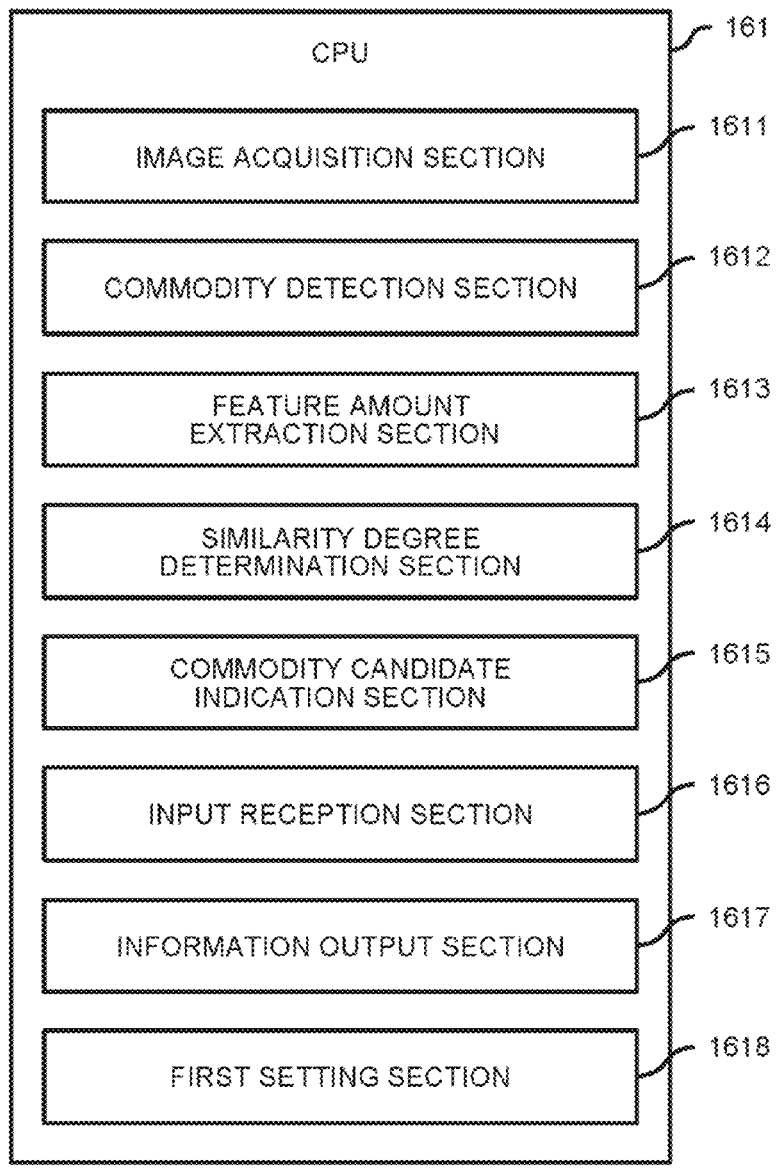
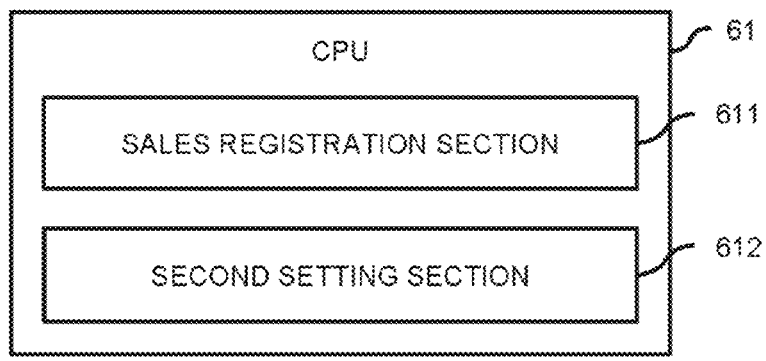

INFORMATION PROCESSING APPARATUS AND INFORMATION PROCESSING METHOD

CROSS-REFERENCE TO RELATED APPLICATION

This application is based upon and claims the benefit of priority from Japanese Patent Application No. 2013-022685, filed Feb. 7, 2013, the entire contents of which are incorporated herein by reference.

FIELD

Embodiments described herein relate to an information processing apparatus and an information processing method.

BACKGROUND

Conventionally, there is a known technology in which a commodity contained in image data is recognized (identified) by comparing the data representing the shape and the like of a standard commodity with the data extracted from the image data. In such a technology, data of commodities in a plurality of categories are registered in advance and then it can be possible to increase the number of commodities which are recognized in correspondence with the number of commodities registered. However, if the number of the registered data is increased, the time taken for the data comparison is increased as well, which may lead to a low recognition efficiency. Further, if the number of the registered data is increased, the frequency of the occurrence of the incorrect recognition may also increase.

BRIEF DESCRIPTION OF THE DRAWINGS

FIG. 3 is a diagram schematically illustrating one example of data configuration of a PLU file shown in FIG. 2;

FIG. 4 is a diagram schematically illustrating one example of data configuration of a recognition target setting file shown in FIG. 2;

FIG. 5 is a block diagram illustrating functional components of the POS terminal and the commodity reading apparatus shown in FIG. 1;

DETAILED DESCRIPTION

In accordance with one embodiment, an information processing apparatus comprises a storage module, an image capturing module, an extraction module, a calculation module, and a recognition module. The storage module stores feature amounts of standard commodities. The image capturing module photographs a commodity to capture an image of the commodity. The extraction module extracts feature amount of the commodity from the image captured by the image capturing module. The calculation module calculates a similarity degree by comparing the feature amount of a standard commodity which is determined as a recognition target in setting information in which a standard commodity serving as a recognition target is set within the standard commodities stored in the storage module with the feature amount of the commodity extracted by the extraction module. The recognition module recognizes a standard commodity of which the similarity degree calculated by the calculation module is greater than a threshold value as a candidate of the commodity.

Hereinafter, taking a checkout system as an example, an information processing apparatus and program according to the present embodiment are described with reference to the accompanying drawings. A store system is a checkout system (POS system) and the like comprising a POS terminal for registering and settling the commodities in one transaction. The present embodiment is an example applied to a checkout system introduced to a store such as a supermarket and the like.

Figure 1:
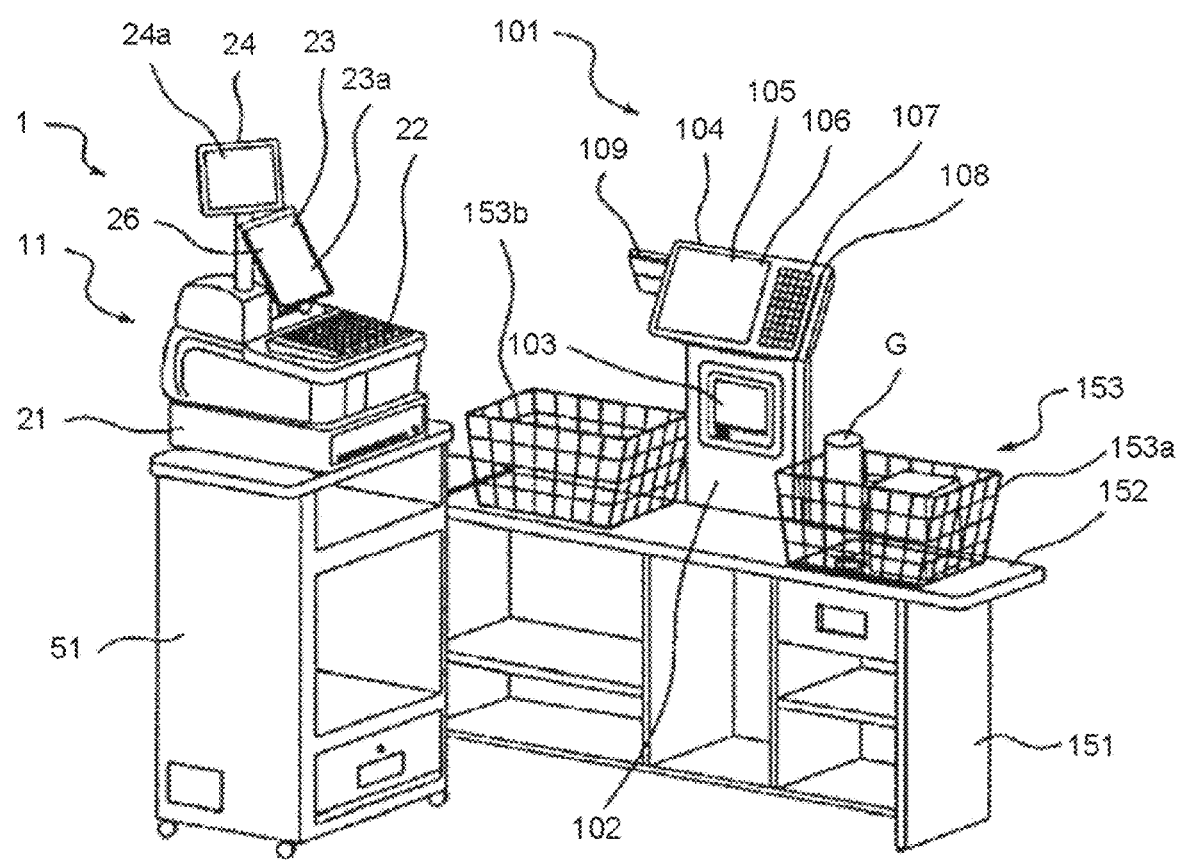
FIG. 1 is a perspective view illustrating an external constitution of a checkout system including a POS terminal and a commodity reading apparatus according to an embodiment.

FIG. 1 is a perspective view illustrating an external constitution of a checkout system 1. As shown in FIG. 1, the checkout system 1 comprises a POS terminal 11 and a commodity reading apparatus 101 serving as an information processing apparatus.

The POS terminal 11 is placed on a drawer 21 on a checkout counter 51. The drawer 21 is opened or closed under the control of the POS terminal 11. A keyboard 22 which is operated by an operator (shop clerk) is arranged on the upper surface of the POS terminal 11. A display device 23 for displaying information to the operator is arranged at a position opposite to the operator with respect to the keyboard 22. The display device 23 displays information on a display screen 23a thereof. A touch panel 26 is laminated on the display screen 23a. A display for customer 24 is vertically arranged to be rotatable at a backside to the display device 23. The display for customer 24 displays information on a display screen 24a thereof.

The display for customer 24 shown in FIG. 1 is in a state in which the display screen 24a thereof faces the operator in FIG. 1, however, the display for customer 24 can be rotated such that the display screen 24a is directed to a customer.

A horizontally elongated counter table 151 is arranged to be in an L shape with the checkout counter 51 on which the POS terminal 11 is placed. A commodity receiving surface 152 is formed on the counter table 151. Shopping basket 153 which receives a commodity G therein is placed on the commodity receiving surface 152. It can be considered to classify the shopping baskets 153 into a first shopping basket 153a held by a customer and a second shopping basket 153b placed facing the first shopping basket 153a across the commodity reading apparatus 101.

The commodity reading apparatus 101, which is connected with the POS terminal 11 to be capable of sending and receiving data, is arranged on the commodity receiving surface 152 of the counter table 151. The commodity reading apparatus 101 comprises a thin rectangular housing 102.

A reading window 103 is arranged at the front side of the housing 102. A display and operation section 104 is installed on the upper portion of the housing 102. A display device 106 on the surface of which a touch panel 105 is laminated is arranged on the display and operation section 104. A keyboard 107 is arranged at the right side of the display device 106. A card reading slot 108 of a card reader (not shown) is arranged at the right side of the keyboard 107. A display for customer 109 is arranged at the left side of the display and operation section 104.

Commodities G purchased in one transaction are put in the first shopping basket 153*a* held by a customer. The commodities G in the first shopping basket 153*a* are moved one by one to the second shopping basket 153*b* by the operator who operates the commodity reading apparatus 101. During the movement, the commodity G is faced to the reading window 103 of the commodity reading apparatus 101. At this time, an image capturing section 164 (referring to FIG. 2) arranged in the reading window 103 captures image of the commodity G.

Figure 2:
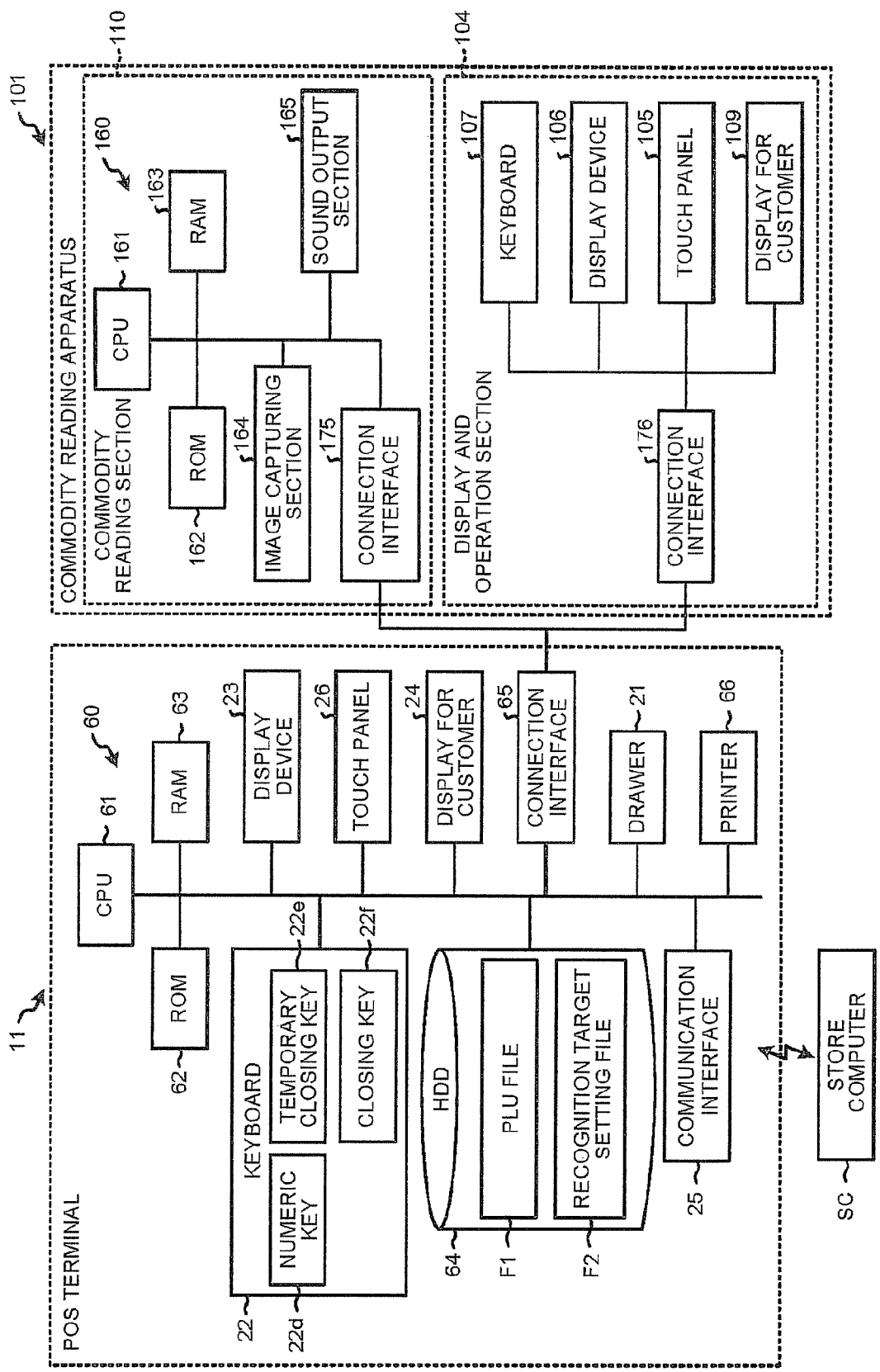
FIG. 2 is a block diagram illustrating hardware arrangement of the POS terminal and the commodity reading apparatus shown in FIG. 1.

FIG. 2 is a block diagram illustrating the hardware arrangement of the POS terminal 11 and the commodity reading apparatus 101.

The POS terminal 11 comprises a microcomputer 60 serving as an information processing section for executing information processing. The microcomputer 60 comprises a CPU (Central Processing Unit) 61 which executes various arithmetic processing to control each section, a ROM (Read Only Memory) 62 and a RAM (Random Access Memory) 63. The ROM 62 stores programs executed by the CPU 61.

The drawer 21, the keyboard 22, the display device 23, the display for customer 24, a communication interface 25, the touch panel 26, an HDD (Hard Disk Drive) 64, a connection interface 65, and a printer 66 are all connected with the CPU 61 of the POS terminal 11 via various input/output circuits (not shown), respectively.

The keyboard 22 includes numeric keys 22*d* on which numeric characters such as '1', '2', '3' . . . and operators such as multiplying operator '*' are respectively indicated, a temporary closing key 22*e* and a closing key 22*f*.

The HDD 64 stores various programs and files. The CPU 61 executes programs, stored in the HDD 64, all or part of which are developed on the RAM 63, when the POS terminal 11 is started.

The HDD 64 stores data files such as a PLU file F1, a recognition target setting file F2 and the like. The PLU file F1 and the recognition target setting file F2 are readable from the commodity reading apparatus 101 via the connection interface 65.

The PLU file F1 is a data file in which a commodity G sold in the store is associated with information relating to the sales registration of the commodity G. FIG. 3 is a diagram schematically illustrating an example of the data configuration of the PLU file F1. As shown in FIG. 3, a commodity ID uniquely assigned to each commodity G, information relating to a commodity such as a commodity category to which the commodity G belongs, a commodity name and a unit price, and a commodity image obtained by photographing the commodity G for each commodity are registered in association with one another in the PLU file F1. Further, in the PLU file F1, feature amount of a commodity (feature amount data of a standard commodity) is also registered (stored) in association with each commodity G in advance.

The commodity image is obtained by photographing each standard commodity to be compared at the time of the similarity degree determination described later. The commodity image is indicated as an image showing the commodity candidate at the time of indication of a commodity candidate which will be described later. Further, the feature amount of a commodity G pre-extracted from the captured image (for example, a commodity image) of each commodity G are registered in association with corresponding commodity ID. The feature amount refers to information representing the feature of the commodity G such as the surface hue, pattern, concave-convex state, shape and the like of a commodity G.

The recognition target setting file F2 is a data file in which a commodity serving as a similarity degree determination target described later is set. FIG. 4 is a diagram schematically illustrating one example of data configuration of the recognition target setting file F2. As shown in FIG. 4, in the recognition target setting file F2, a commodity name of each commodity G, a commodity ID of the commodity, and a recognition target setting representing whether or not there is similarity degree determination in a similarity degree determination section 1614 described later are registered in association with each other. The commodity name and the commodity ID corresponds to the commodity name and the commodity ID registered in the PLU file F1. Further, a circle mark in the column of the recognition target setting represents that the commodity is a similarity degree determination target; if there is no mark in the column of the recognition target setting, it represents that the commodity is excluded from the similarity degree determination target.

The recognition target setting may be set freely. For example, if the commodity ID of the commodity serving as a similarity degree determination target or the commodity which is excluded from a similarity degree determination target is instructed through the keyboard 22, the touch panel 26 or the communication interface 25, the CPU 61 updates the similarity degree determination according to the content of the instruction. Further, the recognition target setting may also be updated automatically through the functions of a first setting section 1618 or a second setting section 612 described later. In addition, the updating timing of the recognition target setting is not limited, and it may be updated at any time. Further, a plurality of recognition target setting files F2 having different setting content may be stored and properly used respectively, for day, for month or for season, for example.

In the present embodiment, the PLU file F1 and the recognition target setting file F2 are separately provided, however, it is not limited to this, the PLU file F1 and the recognition target setting file F2 may be unified as a single file. Further, in the present embodiment, the feature amount of each commodity G is registered in the PLU file F1 in advance, however, it is not limited to this, the feature amount may be extracted from each commodity image by a feature amount extraction section 1613 described later. Further, instead of a commodity image, an image for indication may be registered. Hereinafter, each commodity registered in the PLU file F1 and the recognition target setting file F2 is referred to as a registration commodity.

Returning to FIG. 2, the communication interface 25 for executing data communication with the store computer SC is connected with the CPU 61 of the POS terminal 11 through the input/output circuit (nor shown). The store computer SC is arranged at a backyard and the like of a store. The HDD (not shown) of the store computer SC stores the PLU file F1 sent to the POS terminal 11, a stock management file for managing the stock state of each registration commodity registered in the PLU file F1, and the like.

The connection interface 65 enables the data transmission/reception with the commodity reading apparatus 101. The commodity reading apparatus 101 is connected with the connection interface 65. Further, the printer 66 carries out printing on a receipt. The POS terminal 11 prints transaction content (purchased commodities and the like) in one transaction on a receipt with the printer 66 under the control of the CPU 61.

The commodity reading apparatus 101 comprises a commodity reading section 110 and a display and operation section 104. The commodity reading section 110 comprises a microcomputer 160. The microcomputer 160 comprises a CPU 161, a ROM 162 and a RAM 163. The ROM 162 stores programs executed by the CPU 161.

The CPU 161 is connected with the image capturing section 164, a sound output section 165 and a connection interface 175 through various input/output circuits (not shown). The operations of the image capturing section 164, the sound output section 165 and the connection interface 175 are controlled by the CPU 161.

The image capturing section 164, which includes a color CCD sensor or a color CMOS sensor, is an image capturing module for carrying out an image capturing through the reading window 103. For example, motion images are captured by the image capturing section 164 at 30 fps. The frame images (captured images) sequentially captured by the image capturing section 164 at a given frame rate are stored in the RAM 163. The sound output section 165 includes a sound circuit and a speaker and the like for issuing a preset alarm sound and the like. The sound output section 165 gives a notification through a sound such as an alarm sound under the control of the CPU 161.

The display and operation section 104 comprises the touch panel 105, the display device 106, the keyboard 107, the display for customer 109, and a connection interface 176. The connection interface 175 of the commodity reading section 110, which is connected with the connection interface 65 of the POS terminal 11, enables the data transmission/reception with the POS terminal 11. The connection interface 175 connects with the display and operation section 104 through the connection interface 176, and the CPU 161 carries out data transmission/reception between the commodity reading section 110 and the display and operation section 104 through the connection interface 175.

Next, the functional components of the CPU 161 and the CPU 61 realized by executing programs are described below with reference to FIG. 5.

FIG. 5 is a block diagram illustrating the functional components of the POS terminal 11 and the commodity reading apparatus 101. As shown in FIG. 5, the CPU 161 of the commodity reading apparatus 101 executes programs sequentially to function as an image acquisition section 1611, a commodity detection section 1612, a feature amount extraction section 1613, a similarity degree determination section 1614, a commodity candidate indication section 1615, an input reception section 1616, an information output section 1617, and a first setting section 1618.

The image acquisition section 1611 outputs an ON-signal of image capturing to the image capturing section 164 to enable the image capturing section 164 to start an image capturing operation. The image acquisition section 1611 acquires the images, which are captured by the image capturing section 164 after the image capturing operation is started and stored in the RAM 163, in sequence. The image acquisition section 1611 acquires the captured images from the RAM 163 in the order of storing them to the RAM 163.

The commodity detection section 1612 detects the whole or part of the contour line of a commodity G contained in the captured image acquired by the image acquisition section 1611 using a known pattern matching technology. Next, by comparing the contour line extracted from the last time captured image (frame image) with the contour line extracted from the current frame image (next to the last time), a different part, that is, a reflection image area of a commodity G directed to the reading window 103 is detected.

As another method for detecting a commodity G, it is determined whether or not a flesh color area is detected from the captured image. If the flesh color area is detected, that is, the reflection image of the hand of a shop clerk is detected, the detection of the aforementioned contour line nearby the flesh color area is carried out to try to extract the contour line of the commodity G that is assumed to be held by the shop clerk. At this time, if a contour line representing the shape of a hand and the contour line of another object nearby the contour line of the hand are detected, the commodity G is detected from the contour line of the object.

The feature amount extraction section (extraction module) 1613 extracts the surface state (surface hue, pattern, concave-convex state, shape and the like) of the commodity G detected by the commodity detection section 1612 from the captured image acquired by the image acquisition section 1611 as a feature amount.

The similarity degree determination section (calculation module) 1614 compares the feature amount of each registration commodity set as a similarity degree determination target in the recognition target setting file F2 within the registration commodities registered in the PLU file F1 of the POS terminal 11 with the feature amount extracted by the feature amount extraction section 1613 to calculate similarity degree thereof, respectively. Further, the similarity degree determination section 1614 recognizes the registration commodity (commodity ID) of which the similarity degree within the calculated similarity degrees is greater than a given threshold value as a candidate of the commodity G photographed by the image capturing section 164.

The similarity degree may be a value (similarity degree), which is obtained by comparing the feature amount of the commodity G with the reference feature amount of the commodity in the PLU file F1, representing how much similar the two feature amounts are. The concept of the similarity degree is not limited to the example above. The similarity degree may also be a value representing the degree of coincidence with the feature amount of each registration commodity registered in the PLU file F1, or a value representing the degree of correlation between the feature amount of the commodity G and the feature amount of each registration commodity registered in the PLU file F1.

The recognition of an object contained in an image as stated above is referred to as a general object recognition. As to the general object recognition, various recognition technologies are described in the following document.

Keiji Yanai "Present situation and future of general object recognition", Journal of Information Processing Society, Vol. 48, No. SIG16 [Search on Heisei 25 January 24], Internet <URL: http://mm.cs.uec.ac.jp/IPSJ-TCVIM-Yanai.pdf>

In addition, the technology carrying out the general object recognition by performing an area-division on the image for each object is described in the following document.

Jamie Shotton et. al, "Semantic Texton Forests for Image Categorization and Segmentation", [Search on Heisei 25 January 24], Internet <URL: http://citeseerx.ist.psu.edu/viewdoc/download?doi=10.1.1.145.3036&rep=rep1&type=pdf>

In the present embodiment, no limitation is given to the method for calculating the similarity degree. For example, the similarity degree can be calculated as an absolute evaluation or a relative evaluation. If the similarity degree is calculated as an absolute evaluation, the captured image of the commodity G and each of the registered commodities are compared one by one, and the similarity degree obtained from the comparison result can be adopted as it is. If the similarity degree is calculated as a relative evaluation, the similarity degree can be calculated as long as the sum of the similarity degrees between the captured commodity G and each registration commodity becomes 1.0 (100%). On the other hand, if the registration commodity the similarity degree of which is greater than the given threshold value does not exist, the similarity degree determination section 1614 cooperates with the commodity candidate indication section 1615 to display, on the display device 106, a message informing that the commodity needs to be selected manually using a commodity list described later.

The commodity candidate indication section 1615 displays the information relating to the registration commodity recognized as a candidate by the similarity degree determination section 1614 on the display device 106 as a commodity candidate. More specifically, the commodity candidate indication section 1615 reads the record of the registration commodity recognized as a candidate from the PLU file F1 of the POS terminal 11, and displays it on the display device 106.

Figure 6:
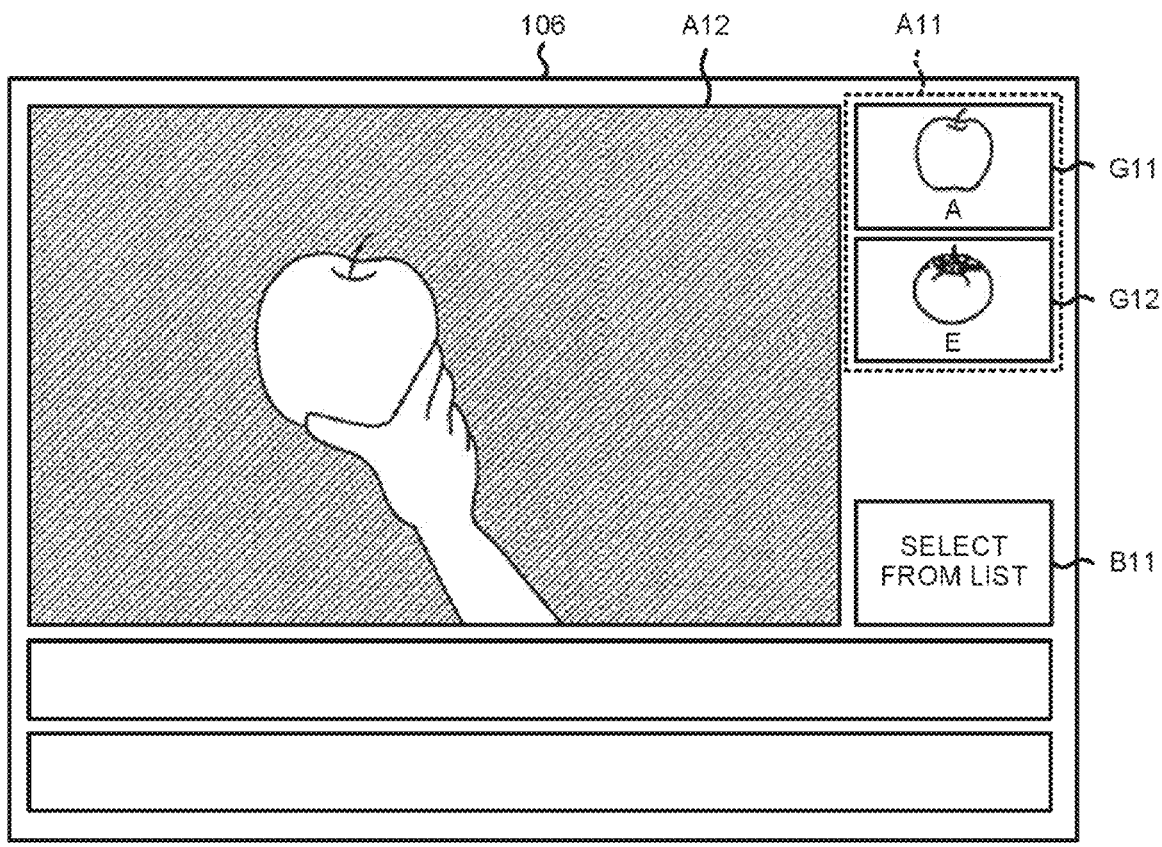
FIG. 6 is a diagram illustrating an example of display of a commodity candidate on a display device of the commodity reading apparatus.

FIG. 6 is a diagram illustrating an example of display of the commodity candidate. As shown in FIG. 6, in the display screen of the display device 106, commodity images G11, G12 contained in the record of the commodity candidate are displayed together with the commodity names in a commodity candidate indication area A11 in a descending order of similarity degree of the registration commodity. These commodity images G11, G12 are selected in response to a touch operation on the touch panel 105. Further, a selection button B11 for selecting a commodity from the commodity list is arranged below the commodity candidate indication area A11. The commodity selected from the commodity list is processed as a determined commodity which will be described later. Further, an image captured by the image capturing section 164 is displayed in an area A12. In addition, it is exemplified that there are two commodity candidates indicated in FIG. 6, however, the display method and the number of the commodity candidates are not limited to this.

Returning to FIG. 5, the input reception section 1616 receives various input operations corresponding to the display of the display device 106 through the touch panel 105 or the keyboard 107. For example, the input reception section 1616 receives a selection operation of one commodity candidate from the commodity candidates displayed on the display device 106. The input reception section 1616 receives the selected commodity candidate as the commodity (determined commodity) corresponding to the commodity G photographed by the image capturing section 164. In a case in which the commodity detection section 1612 is capable of detecting a plurality of commodities G, the input reception section 1616 may receive selection operations of a plurality of commodity candidates within the commodity candidates.

The information output section 1617 outputs the information (for example, the commodity ID, the commodity name and the like) representing the commodity determined in the aforementioned manner to the POS terminal 11 through the connection interface 175.

The information output section 1617 may output the sales volume input separately through the touch panel 105 or the keyboard 107 to the POS terminal 11 together with the commodity ID and the like. Further, as the information output to the POS terminal 11 by the information output section 1617, the commodity ID read from the PLU file F1 by the information output section 1617 may be notified directly, or the commodity name, file name of the commodity image capable of specifying the commodity ID may be notified, or the storage location of the commodity ID (storage address in the PLU file F1) may also be notified.

The first setting section 1618 is a functional section which sets a registration commodity with low recognition precision as a commodity excluded from the similarity degree determination targets in the registration commodities registered in the recognition target setting file F2.

More specifically, the first setting section 1618 determines that an incorrect recognition occurs if a registration commodity (determined commodity) is selected from commodities other than the commodity candidates, in spite of the commodity candidates selected by the similarity degree determination section 1614. Further, the first setting section 1618 records the commodity ID of the registration commodity (determined commodity) which causes the incorrect recognition in the HDD 64 and the like of the POS terminal 11 as an incorrect recognition history information. Then the first setting section 1618 carries out a setting of excluding the registration commodity with the recognition precision below a given value from the similarity degree determination target to update the recognition target setting file F2. The method of calculating the recognition precision is not limited. For example, the recognition precision may be a value obtained by dividing 1 by the number of times in appearance of each registration commodity registered in the incorrect recognition history information.

As stated above, the number of times in occurrence of the incorrect recognition is decreased because the registration commodity with low recognition precision is excluded from the similarity degree determination targets, and therefore, the recognition of the commodity G can be carried out efficiently.

On the other hand, the CPU 61 of the POS terminal 11 functions as a sales registration section 611 and a second setting section 612 by executing programs. The sales registration section 611 carries out a sales registration of a commodity specified with the commodity ID that is output together with the sales volume from the information output section 1617 of the commodity reading apparatus 101. Specifically, the sales registration section 611 records, with reference to the PLU file F1, the notified commodity ID, and the commodity category, commodity name, unit price and the like which are specified with the commodity ID in a sales master file together with the sales volume to carry out the sales registration.

The second setting section 612 excludes registration commodities which are all sold out from the similarity degree determination targets in the registration commodities registered in the recognition target setting file F2. More specifically, the second setting section 612 confirms the stock status of each registration commodity with reference to a stock management file managed by the store computer SC (management module). If a registration commodity, of which the quantity of stock is zero, is detected from the stock management file, the second setting section 612 carries out a setting of excluding the registration commodity (commodity ID) from the similarity degree determination target to update the recognition target setting file F2.

In this way, the registration commodity which is not necessary to be subjected to similarity degree determination is excluded from the similarity degree determination target, and thus, the recognition of commodity G can be carried out efficiently. The stock management, which may also be carried out by the POS terminal 11, is not limited to be carried out by the store computer SC.

Figure 7:
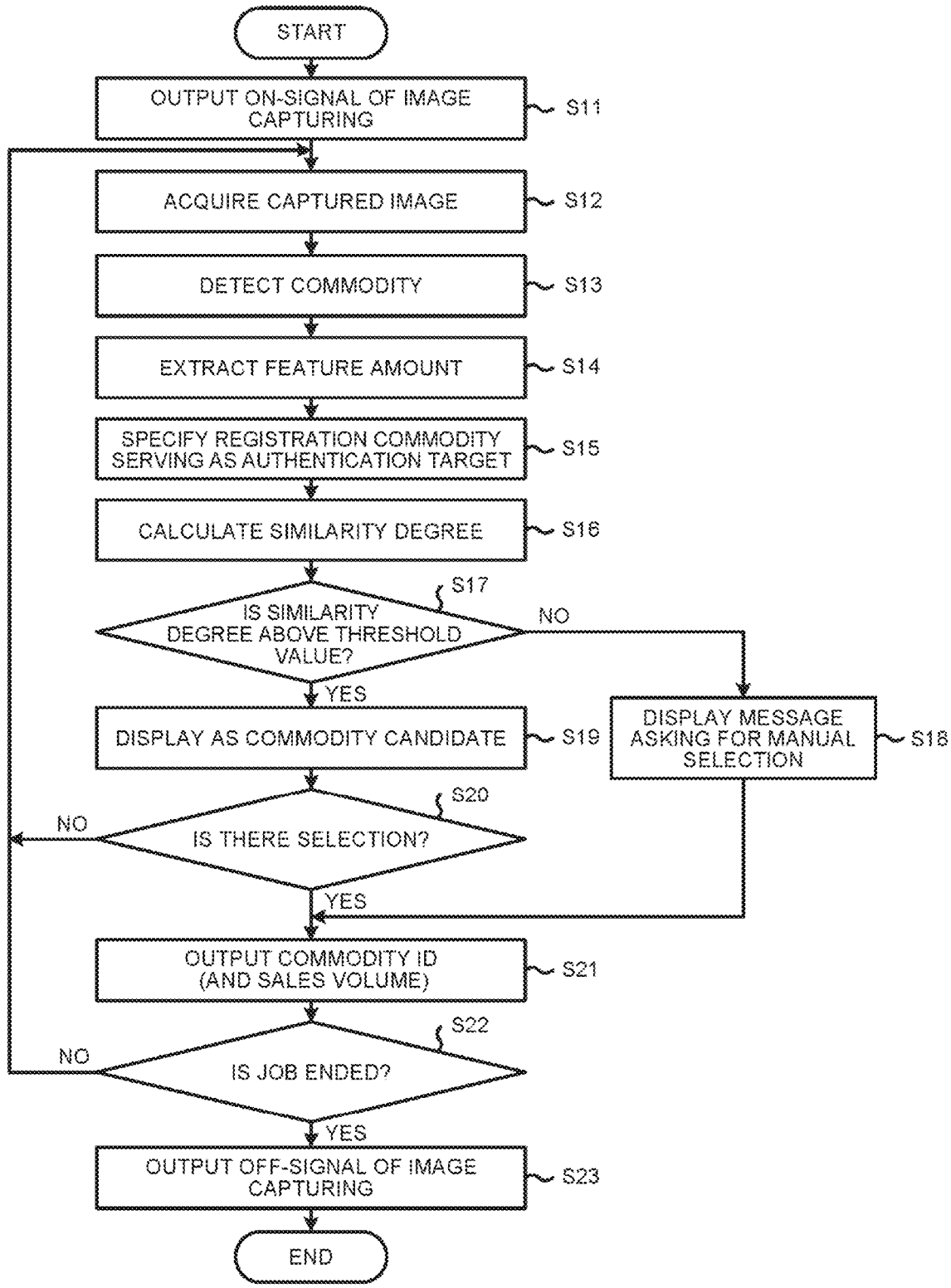
FIG. 7 is a flowchart illustrating a procedure of a commodity recognition processing executed by the commodity reading apparatus.

Hereinafter, the operations of the checkout system 1 are described. First, the operations of the commodity reading apparatus 101 are described with reference to FIG. 7. FIG. 7 is a flowchart illustrating the procedure of the commodity recognition processing executed by the commodity reading apparatus 101.

When the processing in response to a start of the commodity registration by the POS terminal 11 is started, the image acquisition section 1611 outputs an ON-signal of image capturing to the image capturing section 164 to enable the image capturing section 164 to start an image capturing operation (ACT S11).

The image acquisition section 1611 acquires a frame image (captured image) captured by the image capturing section 164 to store it in the RAM 163 (ACT S12). Next, the commodity detection section 1612 detects the whole or part of the commodity G from the captured image acquired in ACT S12 (ACT S13). The feature amount extraction section 1613 extracts the feature amount of the commodity G detected in ACT S13 from the captured image acquired in ACT S12 (ACT S14).

Next, the similarity degree determination section 1614 specifies the registration commodity set as a similarity degree determination target (authentication target) by the recognition target setting file F2 in the registration commodities registered in the PLU file F1 (ACT S15). The similarity degree determination section 1614 compares the feature amount extracted in ACT S14 with the feature amount of each registration commodity specified in ACT S15 to calculate similarity degrees respectively (ACT S16). Then, the similarity degree determination section 1614 determines whether or not there exists a registration commodity of which the similarity degree calculated in ACT S16 is greater than the given threshold value (ACT S17).

In ACT S17, if it is determined that there is a registration commodity of which the similarity degree is greater than the threshold value (YES in ACT S17), ACT S19 is taken. If it is determined that there is no registration commodity of which the similarity degree is greater than the threshold value (NO in ACT S17), the feature amount extraction section 1613 displays a message indicating that the commodity needs to be selected manually on the display device 106 (ACT S18), and then ACT S21 is taken.

Then, the commodity candidate indication section 1615 reads the record of the registration commodity recognized as a candidate in ACT S17 from the PLU file F1 of the POS terminal 11, and displays it on the display device 106 as a commodity candidate (ACT S19).

The input reception section 1616 determines whether or not the selection of the commodity candidate is received through the touch panel 105 or the keyboard 107 (ACT S20). If the selection operation is received (YES in ACT S20), the input reception section 1616 receives the selected commodity candidate as the determined commodity corresponding to the commodity G photographed by the image capturing section 164, and then ACT S21 is taken. On the other hand, if no selection is received (NO in ACT S20), ACT S12 is taken.

Then, the information output section 1617 outputs information including the commodity ID and the like representing the determined commodity selected to the POS terminal 11 through the connection interface 175 (ACT S21), and then ACT S22 is taken.

When the sales volume (number of sales volumes) is input separately through the touch panel 105 or the keyboard 107, the sales volume is also output to the POS terminal 11 together with information representing the determined commodity in ACT S21. On the other hand, if the sales volume is not input, the sales volume "1" may be output as a default value.

In ACT S22, the CPU 161 determines whether or not the job is ended according to the notification of termination of the commodity registration from the POS terminal 11 (ACT S22). If the job is continued (NO in ACT S22), the CPU 161 returns to the processing in ACT S12 to continue the processing. If the job is ended (YES in ACT S22), the image acquisition section 1611 outputs an OFF-signal of the image capturing to the image capturing section 164 to terminate the image capturing of the image capturing section 164 (ACT S23), and then the processing is ended.

Figure 8:
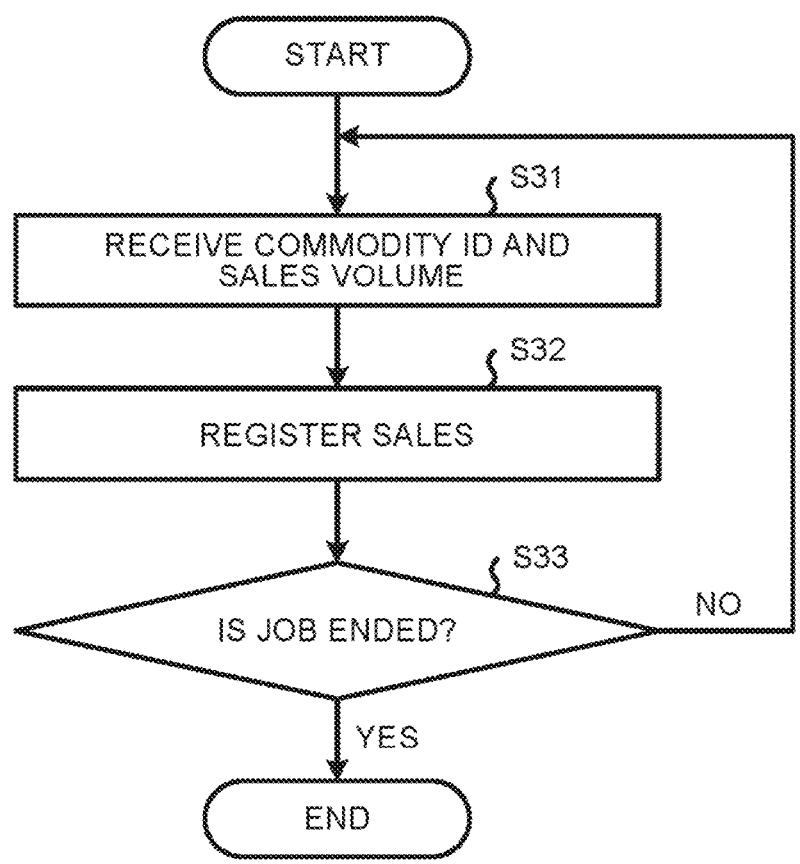
FIG. 8 is a flowchart illustrating a procedure of a sales registration processing executed by the POS terminal.

Next, the processing operations of the POS terminal 11 are described. FIG. 8 is a flowchart illustrating the procedure of the sales registration processing executed by the POS terminal 11.

First, if the processing in response to a start of the commodity registration based on an operation instruction from the keyboard 22 is started, the CPU 61 receives the commodity ID and the sales volume of the determined commodity output by the commodity reading apparatus 101 in ACT S21 shown in FIG. 7 (ACT S31). Then, the sales registration section 611 reads the commodity category, the unit price and the like from the PLU file F1 based on the commodity ID and the sales volume received in ACT S31 and registers the sales of the commodity G read by the commodity reading apparatus 101 in the sales master file (ACT S32).

Then, the CPU 61 determines whether or not the job is ended based on the termination of the sales registration according to the operation instruction from the keyboard 22 (ACT S33). If the job is continued (NO in ACT S33), the CPU 61 returns to ACT S31 to continue the processing. Further, if the job is ended (YES in ACT S33), the CPU 61 ends the processing.

As stated above, according to the present embodiment, recognition of commodity G is carried out using the feature amount of each registration commodity set as a similarity degree determination target in the registration commodities registered in the PLU file F1. In this way, an unexpected occurrence in which the comparison of the commodity G with all the registration commodities registered in the FLU file F1 is accidentally executed is prevented, and therefore, the recognition of commodity G can be carried out efficiently.

While certain embodiments have been described, these embodiments have been presented by way of example only, and are not intended to limit the scope of the invention. Indeed, the novel embodiments described herein may be embodied in a variety of other forms; furthermore, various omissions, substitutions and changes in the form of the embodiments described herein may be made without departing from the spirit of the invention. The accompanying claims and their equivalents are intended to cover such forms or modifications as would fall within the scope and spirit of the invention.

For example, in the embodiment stated above, the POS terminal 11 includes the PLU file F1 and the recognition target setting file F2, however, it is not limited to this, and all or part of the FLU file F1 and the recognition target setting file F2 may be included in the commodity reading apparatus 101.

Further, the discrimination of the commodity candidate is carried out in the commodity reading apparatus 101, however, all or part of the functional sections of the commodity reading apparatus 101 may be included in the POS terminal 11.

For example, the POS terminal 11 may include the feature amount extraction section 1613 and the similarity degree determination section 1614, while the commodity reading apparatus 101 may include the image acquisition section 1611, the commodity detection section 1612, the commodity candidate indication section 1615, the input reception section 1616 and the information output section 1617. In this case, in the commodity reading apparatus 101, the photographed image, which is acquired by the image acquisition section 1611 and from which the commodity is detected by the commodity detection section 1612, is sent to the POS terminal 11. Further, the commodity reading apparatus 101 receives the result of the commodity (registration commodity) recognized in the POS terminal 11, and indicates the received result as a commodity candidate by the commodity candidate indication section 1615. In a case in which the POS terminal 11 includes all the functional sections of the commodity reading apparatus 101, the commodity reading apparatus 101 functions as an image capturing apparatus, and the POS terminal 11 carries out the display and selection of a commodity candidate based on the captured image sent from the commodity reading apparatus 101.

Further, in the embodiment stated above, the commodity reading apparatus 101 includes the first setting section 1618, while the POS terminal 11 includes the second setting section 612, however, the two setting sections maybe arranged in either of the POS terminal 11 or the commodity reading apparatus 101.

Still further, in the embodiment stated above, an example is exemplified where a stationary type scanner apparatus (commodity reading apparatus 101) is used, however, it is not limited to this, and any handy type scanner apparatus connected with the POS terminal 11 may be used.

In the embodiment stated above, in a checkout system 1 including the POS terminal 11 and the commodity reading apparatus 101, the present invention is applied to the commodity reading apparatus 101, however, it is not limited to this, it may be applied to a single apparatus comprising all the functions of the POS terminal 11 and the commodity reading apparatus 101, or a checkout system, for example, in which the commodity reading apparatus 101 and the POS terminal 11 shown in FIG. 1 are connected in a wired or wireless manner. As a single apparatus comprising all the functions of the POS terminal 11 and the commodity reading apparatus 101, a self-checkout apparatus (hereinafter referred to as a self-POS in short) arranged and used in a store such as a supermarket and the like is listed.

Figure 9:
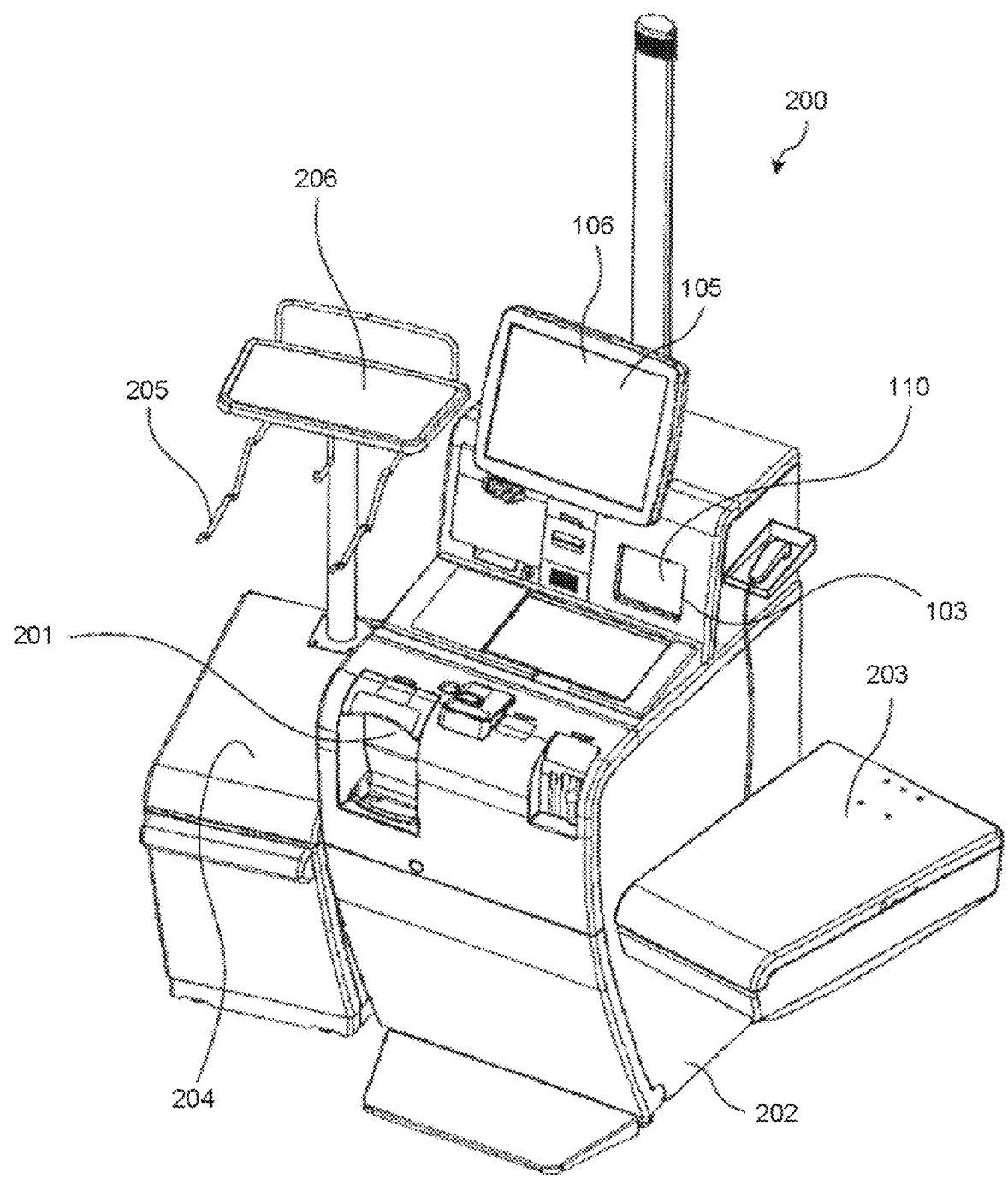
FIG. 9 is a perspective view illustrating a constitution of a self-checkout POS according to an embodiment.
Figure 10:
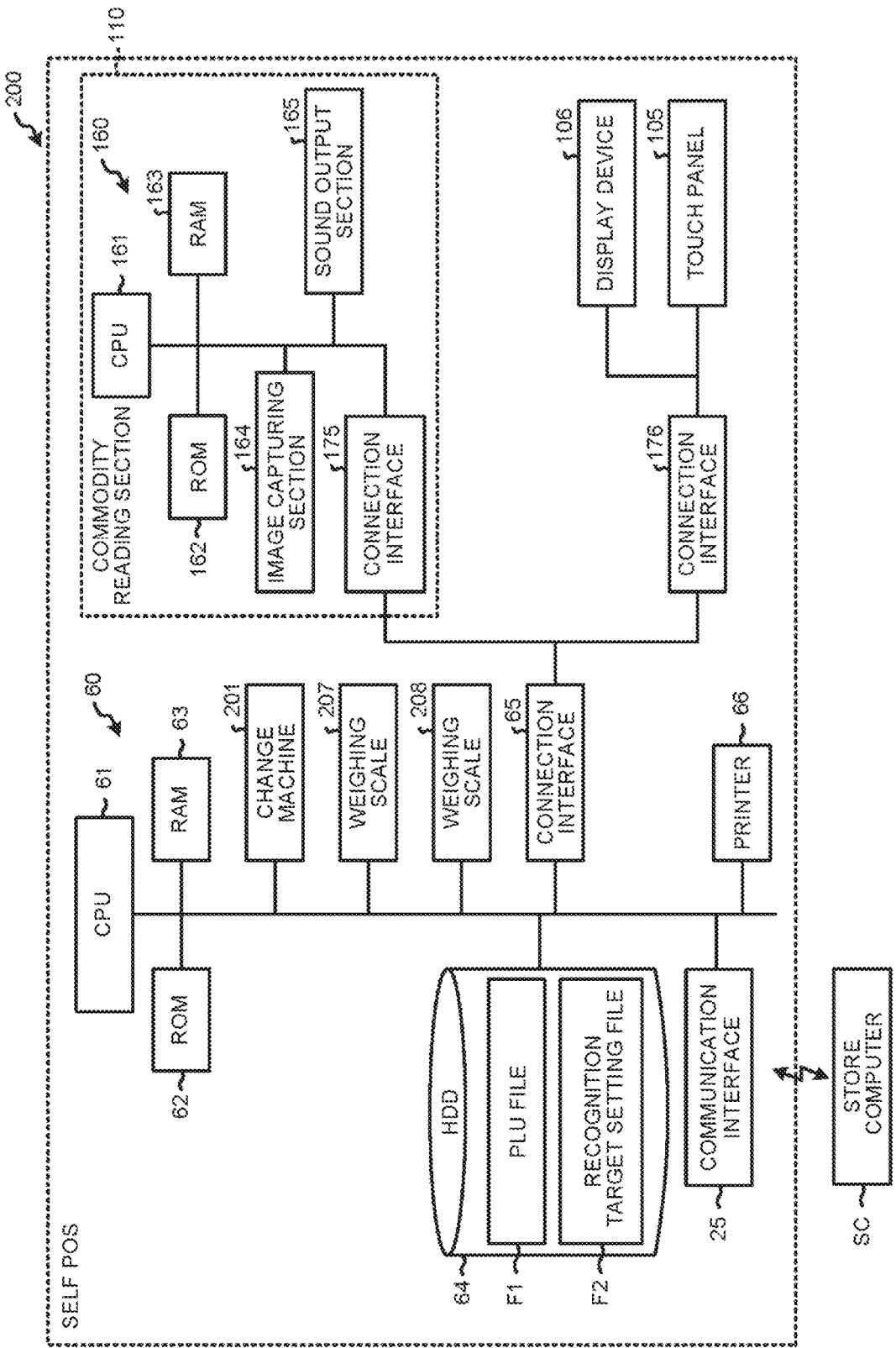
FIG. 10 is a block diagram illustrating hardware arrangement of the self-checkout POS shown in FIG. 9.

Herein, FIG. 9 is a perspective view illustrating the external constitution of the self-POS 200, and FIG. 10 is a block diagram illustrating the hardware arrangement of the self-POS 200. Hereinafter, components in FIGS. 9 and 10 similar to those in FIGS. 1 and 2 are applied with the same reference numerals, and therefore, the detailed descriptions thereof are not repeated.

As shown in FIG. 9 and FIG. 10, a main body 202 of the self-POS 200 includes a display device 106 having a touch panel 105 on the surface thereof and a commodity reading section 110 which reads a commodity image to recognize (detect) the category of a commodity.

The display device 106 may be, for example, a liquid crystal display. The display device 106 displays a guidance screen for providing the customer a guidance for the operation of the self-POS 200, various input screens, a registration screen for displaying the commodity information read by the commodity reading section 110, a settlement screen, on which a total amount, a deposit amount and a change amount are displayed and through which a payment method can be selected, and the like.

The commodity reading section 110 reads a commodity image by the image capturing section 164 when the customer puts the code symbol attached to a commodity in front of the reading window 103 of the commodity reading section 110.

Further, a commodity placing table 203 for placing the unsettled commodity in a shopping basket is arranged at the right side of the main body 202, and a commodity placing table 204 for placing the settled commodity is arranged at the left side of the main body 202. In addition, a bag hook 205 for hooking a bag into which the settled commodities are put and an auxiliary placing table 206 for placing the settled commodities temporarily before the settled commodities are put into the bag are also arranged at the left side of the main body 202. The commodity placing tables 203 and 204 are provided with weighing scales 207 and 208 respectively, and are therefore capable of confirming whether or not the weight of commodities is the same as that before and after a settlement.

Further, a change machine 201 for receiving bill for settlement and discharging bill as a change is arranged in the main body 202 of the self-POS 200.

In a case in which the present invention is applied to the self-POS 200 having such configurations, the self-POS 200 functions as an information processing apparatus. Further, the apparatus comprising the functions of the POS terminal 11 and the commodity reading apparatus 101 is not limited to the self-POS 200 having the construction described above, and may be provided with no weighing scales 207 and 208.

In the embodiment above, the programs executed by each apparatus are pre-incorporated in the storage medium (ROM or storage section) of each apparatus, however, the present invention is not limited to this, and the programs may be recorded in a computer-readable recording medium such as CD-ROM, flexible disk (FD), CD-R, DVD (Digital Versatile Disk) in the form of installable or executable file. Further, the storage medium, which is not limited to a medium independent from a computer or an incorporated system, further includes a storage medium for storing or temporarily storing the downloaded program transferred via an LAN or the Internet.

In addition, the programs executed by each apparatus described in the embodiments above may be stored in a computer connected with a network such as the Internet to be downloaded through the network, download, or distributed via the network.

Alternatively, the programs mentioned in the embodiments above may be incorporated in a portable information terminal such as a mobile phone having a communication function, a smart phone, a PDA (Person Digital Assistant) and the like to realize the functions of the programs.

What is claimed is:

1. An information processing apparatus, comprising:
   a memory storing therein feature amounts of standard commodities; and
   a processor coupled to the memory, the processor configured to:
   photograph a commodity to capture an image of the commodity;
   extract feature amount of the commodity from the captured image;
   calculate a similarity degree by comparing the feature amount of a standard commodity which is determined as a recognition target in setting information in which the standard commodity serving as a recognition target is set within the plurality of standard commodities with the feature amount of the extracted commodity; and
   recognize a standard commodity of which the calculated similarity is greater than a threshold value as a candidate of the commodity.

2. The information processing apparatus according to claim 1, wherein the processor is configured to:
   set a commodity to be or not to be a recognition target in the setting information.

3. The information processing apparatus according to claim 2, wherein the processor is configured to:
   record a standard commodity which is incorrectly recognized as history information; and set, based on the history information, a standard commodity of which the recognition precision is smaller than the threshold value to be a commodity excluded from the recognition target.

4. The information processing apparatus according to claim 3, wherein the processor is configured to:
   indicate a standard commodity recognized as a candidate in a selectable manner;
   determine the selected standard commodity as the commodity; and
   record, if a standard commodity is selected from standard commodities other than the indicated standard commodities, the selected standard commodity in the history information as an incorrect recognition.

5. The information processing apparatus according to claim 2, wherein the processor is configured to:
   detect a standard commodity of which the quantity of stock is zero, and set the detected standard commodity to be excluded from the recognition target in the setting information.

6. An information processing method, comprising:
   a processor to execute the following acts:
   storing feature amounts of a plurality of standard commodities;
   photographing a commodity to capture an image of the commodity;
   extracting feature amount of the commodity from the captured image;
   calculating a similarity degree by comparing the feature amount of a standard commodity which is determined as a recognition target in setting information in which a standard commodity serving as a recognition target is set within the plurality of standard commodities with the feature amount of the extracted commodity; and
   recognizing a standard commodity of which the calculated similarity degree is greater than a threshold value as a candidate of the commodity.

7. The information processing method according to claim 6, further comprising:
   setting a commodity to be or not to be a recognition target in the setting information.

8. The information processing method according to claim 7, further comprising:
   recording a standard commodity which is incorrectly recognized in the recognition processing as history information; wherein
   a standard commodity of which the recognition precision is smaller than a threshold value is set to be a commodity excluded from the recognition target based on the history information.

9. The information processing method according to claim 8, further comprising:
   indicating a standard commodity recognized as a candidate in a selectable manner;
   determining the selected standard commodity as the commodity; and
   recording, if a standard commodity is selected from standard commodities other than the indicated standard commodities, the selected standard commodity in the history information as an incorrect recognition.

10. The information processing method according to claim 7, further comprising:
    detecting a standard commodity of which the quantity of stock is zero, and setting the detected standard commodity to be excluded from the recognition target in the setting information.

\* \* \* \* \*